(12) United States Patent
Kovacevic

(10) Patent No.: US 8,260,109 B2
(45) Date of Patent: *Sep. 4, 2012

(54) SYSTEM FOR DIGITAL TIME SHIFTING AND METHOD THEREOF

(75) Inventor: Branko D. Kovacevic, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1804 days.

This patent is subject to a terminal disclaimer.

(21) Appl. No.: 11/492,681

(22) Filed: Jul. 25, 2006

(65) Prior Publication Data

US 2007/0009236 A1    Jan. 11, 2007

(51) Int. Cl.
*H04N 9/80* (2006.01)

(52) U.S. Cl. ...................................................... 386/239

(58) Field of Classification Search .................. None
See application file for complete search history.

(56) References Cited

U.S. PATENT DOCUMENTS

| | | |
|---|---|---|
| 5,457,701 A | 10/1995 | Wasilewski et al. |
| 5,506,904 A | 4/1996 | Sheldrick et al. |
| 5,517,250 A | 5/1996 | Hoogenboom et al. |
| 5,521,922 A | 5/1996 | Fujinami et al. |
| 5,521,927 A | 5/1996 | Kim et al. |
| 5,559,999 A | 9/1996 | Maturi et al. |
| 5,598,415 A | 1/1997 | Nuber et al. |
| 5,691,664 A | 11/1997 | Anderson et al. |
| 5,703,887 A | 12/1997 | Heegard et al. |
| 5,726,989 A | 3/1998 | Dokic |
| 5,742,623 A | 4/1998 | Nuber et al. |
| 5,754,783 A | 5/1998 | Mendelson et al. |
| 5,768,292 A | 6/1998 | Galbi |
| 5,778,191 A | 7/1998 | Levine et al. |
| 5,801,781 A | 9/1998 | Hiroshima et al. |
| 5,805,602 A | 9/1998 | Cloutier et al. |
| 5,809,538 A | 9/1998 | Pollmann et al. |
| 5,812,760 A | 9/1998 | Mendenhall et al. |
| 5,812,976 A | 9/1998 | Ryan |
| 5,828,416 A | 10/1998 | Ryan |
| 5,831,690 A | 11/1998 | Lyons et al. |
| 5,835,493 A | 11/1998 | Magee et al. |

(Continued)

FOREIGN PATENT DOCUMENTS

EP    0942603 A2    9/1999

(Continued)

OTHER PUBLICATIONS

"Transmission of Non-Telephone Signals," Information Technology—Generic Coding of Moving Pictures and Associated Audio Information: Systems, ITU-T Recommendation H.222.0, Jul. 1995, 120 pages.

(Continued)

*Primary Examiner* — William C Vaughn, Jr.
*Assistant Examiner* — Daniel Tekle

(57) ABSTRACT

A multiplexed packetized data stream carrying real-time multimedia programs is received at a first hardware demultiplexer. Based on a user input, a video and timing portion of a program associated with the multiplexed packetized data stream can be stored for subsequent display. One type of subsequent display is time shifted display, where the stored portion of the program is played back while new portions of the program are being stored. During time shifted play back, a second hardware demultiplexer can be used, so that one demultiplexer stores new data and maintains a current clock value while the other decodes and displays the stored data.

13 Claims, 6 Drawing Sheets

U.S. PATENT DOCUMENTS

| | | | |
|---|---|---|---|
| 5,841,472 | A | 11/1998 | Rim et al. |
| 5,856,973 | A | 1/1999 | Thompson |
| 5,859,660 | A | 1/1999 | Perkins et al. |
| 5,898,695 | A * | 4/1999 | Fujii et al. .................... 370/464 |
| 5,901,178 | A | 5/1999 | Lee et al. |
| 5,917,830 | A | 6/1999 | Chen et al. |
| 5,920,572 | A | 7/1999 | Washington et al. |
| 5,923,860 | A | 7/1999 | Olarig |
| 5,936,640 | A | 8/1999 | Horan et al. |
| 5,936,925 | A | 8/1999 | Yoshio et al. |
| 5,946,318 | A | 8/1999 | Post |
| 5,948,119 | A | 9/1999 | Bock et al. |
| 5,949,436 | A | 9/1999 | Horan et al. |
| 5,959,659 | A | 9/1999 | Dokic |
| 5,982,436 | A | 11/1999 | Balakrishnan et al. |
| 5,990,958 | A | 11/1999 | Bheda et al. |
| 6,014,368 | A | 1/2000 | Sanami |
| 6,038,000 | A | 3/2000 | Hurst, Jr. |
| 6,043,828 | A | 3/2000 | Ort |
| 6,058,459 | A | 5/2000 | Owen et al. |
| 6,067,303 | A | 5/2000 | Aaker et al. |
| 6,072,832 | A | 6/2000 | Katto |
| 6,108,046 | A | 8/2000 | Wu et al. |
| 6,118,462 | A | 9/2000 | Margulis |
| 6,122,123 | A | 9/2000 | Saeijs et al. |
| 6,128,026 | A | 10/2000 | Brothers, III |
| 6,134,272 | A | 10/2000 | Rim |
| 6,141,358 | A | 10/2000 | Hurst, Jr. et al. |
| 6,148,135 | A | 11/2000 | Suzuki |
| 6,157,674 | A | 12/2000 | Oda et al. |
| 6,173,333 | B1 | 1/2001 | Jolitz et al. |
| 6,181,706 | B1 | 1/2001 | Anderson et al. |
| 6,181,713 | B1 | 1/2001 | Patki et al. |
| 6,188,703 | B1 | 2/2001 | Dobson et al. |
| 6,223,211 | B1 | 4/2001 | Hamilton et al. |
| 6,226,291 | B1 | 5/2001 | Chauvel et al. |
| 6,226,769 | B1 | 5/2001 | Schuster et al. |
| 6,233,256 | B1 | 5/2001 | Dieterich et al. |
| 6,233,389 | B1 | 5/2001 | Barton et al. |
| 6,236,432 | B1 | 5/2001 | Lee |
| 6,269,107 | B1 | 7/2001 | Jong |
| 6,275,507 | B1 | 8/2001 | Anderson et al. |
| 6,275,534 | B1 | 8/2001 | Shiojiri |
| 6,285,408 | B1 | 9/2001 | Choi et al. |
| 6,292,490 | B1 | 9/2001 | Gratacap et al. |
| 6,301,248 | B1 | 10/2001 | Jung et al. |
| 6,310,652 | B1 | 10/2001 | Li et al. |
| 6,310,898 | B1 | 10/2001 | Schwartz |
| 6,310,922 | B1 | 10/2001 | Canfield et al. |
| 6,323,910 | B1 | 11/2001 | Clark, III |
| 6,330,285 | B1 | 12/2001 | Crosby et al. |
| 6,333,938 | B1 | 12/2001 | Baker |
| 6,336,200 | B1 | 1/2002 | Wolfgang |
| 6,351,471 | B1 | 2/2002 | Robinett et al. |
| 6,356,567 | B2 | 3/2002 | Anderson et al. |
| 6,359,911 | B1 | 3/2002 | Movshovich et al. |
| 6,378,035 | B1 | 4/2002 | Parry et al. |
| 6,380,991 | B1 | 4/2002 | Teichmer |
| 6,414,954 | B1 | 7/2002 | Miyamoto |
| 6,424,658 | B1 | 7/2002 | Mathur |
| 6,425,021 | B1 | 7/2002 | Ghodrat et al. |
| 6,427,169 | B1 | 7/2002 | Elzur |
| 6,434,146 | B1 | 8/2002 | Movshovich et al. |
| 6,434,170 | B1 | 8/2002 | Movshovich et al. |
| 6,438,145 | B1 | 8/2002 | Movshovich et al. |
| 6,449,352 | B1 | 9/2002 | Takahashi et al. |
| 6,449,656 | B1 | 9/2002 | Elzur et al. |
| 6,463,059 | B1 | 10/2002 | Movshovich et al. |
| 6,463,486 | B1 | 10/2002 | Parry et al. |
| 6,493,847 | B1 | 12/2002 | Sorgi et al. |
| 6,512,775 | B1 | 1/2003 | Eleftheriades et al. |
| 6,526,175 | B2 | 2/2003 | Sodagar et al. |
| 6,538,999 | B1 | 3/2003 | Sato |
| 6,557,031 | B1 | 4/2003 | Mimura et al. |
| 6,567,471 | B1 | 5/2003 | Yoshinari |
| 6,573,942 | B1 | 6/2003 | Crinon |
| 6,621,870 | B1 | 9/2003 | Gordon et al. |
| 6,751,170 | B2 | 6/2004 | Ueki |
| 6,792,000 | B1 * | 9/2004 | Morinaga et al. ............. 370/473 |
| 2003/0206605 | A1 | 11/2003 | Anderson |

FOREIGN PATENT DOCUMENTS

EP           1014730 A1    6/2000

OTHER PUBLICATIONS

"Information Technology—Generic Coding of Moving Pictures and Associated Audio Information—Part 3: Audio," ISO/IEC 13818-3, Second Edition, Apr. 15, 1998, 116 pages.

Chen, Zhigang et al.,"Real Time Video and Audio in the World Wide Web," 17 pp. [online] [Retrieved from the Internet Apr. 2, 2008 at URL <http://www.geckil.com/~harvest/mirror/www.w3.org/Conferences/WWW4/Papers/p211/>.

Civanlar et al., "RTP Payload Format for Bundled MPEG," May 1998, 8 pp. [online] [Retrieved from the Internet Apr. 2, 2008 URL <http://www.geckil.com/~harvest/rfc/rfc2343.txt>.

Hoffman et al., "RTP Payload Format for MPEG1/MPEG2 Video," Jan. 1998, 15 pages, [online] [Retrieved from the Internet Apr. 2, 2008 URL <http://www.geckil.com/~harvest/rfc/rfc2250.txt>.

Bolot et al., "Adaptive Error Control for Packet Video in the Internet," International Conference on Image processing, 1996. Proceedings, pp. 25-28, vol. 1, Sep. 16-19, 1996, ISBN 0-7803-3259-8.

Feng, Jian et al., "Error Concealment for MPEG Video Transmissions," Mar. 13, 1997, IEEE Transactions on Consumer Electronics, pp. 183-187, vol. 43, Issue 2, ISSN 0098-3063.

Le Gall, Didier "MPEG: Video Compression Standard for Multimedia Applications," Communications of the ACM, Apr. 1991, vol. 34, No. 4, pp. 47-58.

Zhu, Wenw et al., "End-to-end Modeling and Simulation of MPEG-2 Transport Streams over ATM Networks with Jitter," 1998 IEEE Transactions on Circuits and Systems for Video Technology, vol. 8, No. 1, Feb. 1998, pp. 9-12.ZHU.

Kassler et al., "Simulating MPEG-2 Transport Stream Transmission over Wireless ATM," 1999 IEEE, 0-7803-5041-3/99, pp. 3057-3060.

* cited by examiner

SYSTEM FOR DIGITAL TIME SHIFTING AND METHOD THEREOF

CROSS-REFERENCE TO RELATED APPLICATION

The present application claims priority from U.S. patent application Ser. No. 09/707,060, filed Nov. 6, 2000, entitled "SYSTEM FOR DIGITAL TIME SHIFTING AND METHOD THEREOF," naming inventor Branko Kovacevic, which application is incorporated by reference herein in its entirety.

FIELD OF THE DISCLOSURE

The present invention relates generally to time shifting of video data, and more specifically to time shifting of digital video data.

BACKGROUND

Systems for time shifting a viewed program are known in the industry. For example, if a viewer is interrupted by a phone call during a television program, the program can be recorded for a few minutes and then played back from the point of interruption while addition video information is continually recorded. One prior art method of accomplishing time shifting is to capture the rendered video signal. When the rendered signal is an analog signal it is digitized and stored. When the rendered signal is a digital signal it can be captured directly. Once captured, the rendered digital data can be stored directly. A digital signal stored directly can require a large amount of storage space, even when only a few minutes of video are captured. The digital signal can be compressed to reduce the amount of storage space required. However, compressing a video signal requires additional processing power, resulting in additional costs.

As the use of digital video data becomes increasingly common, a method and apparatus for time shifting a digital program that is more efficient than those known in art would be advantageous. One known method to provide digital video data is to provide the data using a specific protocol that has the ability to transmit the digital video data in a compressed format. An example of one such format is known as MPEG-2, and has been approved by the International Organization for Standards (ISO) Moving Pictures Experts Group (MPEG group). MPEG-2 is a versatile communication standard that gives theoretical explanations needed to implement an MPEG-2 decoder through the syntax and semantics of coded bit-streams. MPEG-2 is an open standard and continues to evolve and be applied to a wide variety of applications ranging from video conferencing to High Definition Television (HDTV). The MPEG-2 standard, as a generic and open standard, is intended for variety of audio/video coding applications.

One method of transporting large amounts of various types of transport stream data is to use a multiplexed packetized data stream capable of carrying real-time multimedia programs. One example of a multiplexed packetized data stream is described in the standard ISO/IEC 13818-1 and will be referred to as a transport stream. Transport streams generally offer robustness for noisy channels and can carry multiple programs (like multiple TV services) within the same multiplex. The transport stream is based on 188 byte long packets that are well suited for hardware error correction and processing schemes needed in noisy environments, such as coaxial cable television networks and satellite transponders. Such a transport stream facilitates fast program access, channel hopping and synchronization between multiple programs within the transport stream.

A transport stream consists of fixed length packets based on 4 bytes of header followed by 184 bytes of data payload, where data payload is obtained by partitioning larger data blocks. For example, an elementary stream (ES) is a set of data generally consisting of compressed data from a single source, such as a video or audio source, with some additional ancillary data for identification, characterization and synchronization. ES streams are first packetized into either constant length or variable length Packetized Elementary Stream packets (PES packets) consisting of a header and payload. Each PES packet header starts with start code (ox000001) followed with the stream_id byte identifying type of ES underneath.

PES packets from various elementary streams are merged together to form a program (service) with its own system time clock (STC). All ES component streams within one program are synchronized have periodic PTS stamps corresponding to the STC counter to indicate the proper timing for each ES.

The relatively long and most often variable length PES packets are further packetized into shorter TS packets having a constant size of 188 bytes. A small and constant TS packet size makes error recovery easier and faster. Usually, the transport stream carries several programs, each with its own STC. Each TS packet consists of a TS Packet header with optional Adaptation Field followed by useful data payload containing portion of a PES packet. The TS header consists of a sync byte, flags, indicators information for error detection and timing and Packet_ID (PID) field used to identify elementary stream carried underneath of a PES packet. In addition to identifying specific elementary streams, one PID is used to identify a program specific Information (PSI) table data.

Each TS PSI table is sent in sections, usually occupying one or more TS packets. Four types of PSI tables exist: 1) Program Association Table (PAT) listing unique program_number (as an identifier of each program in one multiplex) and PID of the PMT table; 2) Program Map Table (PMT) listing PIDs of all component streams making a given program. PMT may be constructed for each program separately or be common for a group of programs; 3) Conditional Access Table (CAT) identifying PID of Entitlement Management Messages and ID of used conditional access system if any scrambling of TS or PES packets is done; 4) Private Table carrying Network Information Table (NIT) or private data.

The Hierarchical structure which exists between ES streams, PES and TP packets is illustrated in prior art FIG. 1-4.

A method and apparatus for efficient time shifting of multiplexed packetized data streams, such as a packet stream, would be advantageous.

DETAILED DESCRIPTION OF THE DRAWINGS

A specific method and apparatus is disclosed describing a time shifting technique. In one embodiment, the disclosed time shifting technique can be based upon a hardware transport stream demultiplexer that interfaces to a transport stream. The hardware demultiplexer application assists in the extraction and parsing of a multiplexed packetized data stream, such as a MPEG-2 Transport Stream (TS) multiplex. One such hardware demultiplexer is disclosed in pending U.S. patent application Ser. No. 09/489,682, entitled "METHOD AND SYSTEM FOR ACCESSING PACKETIZED ELEMENTARY STREAM DATA" (0100.9901350), which is hereby incorporated herein by reference. The disclosed hardware transport core is used to filter component streams into 15 memory ring buffers, one allocated in the frame memory for the dedicated MPEG-2 video decoder and others in the system memory for the dedicated software parser. It can demultiplex the most frequent transport packets of video stream into an Elementary Stream (ES) by monitoring the first packet identifier (PID) of each TS packet. This flexible filter can be set to extract private data from the adaptation field (AF) or from the PES packet header. Thirty-one other PIDs can be simply filtered and routed to a common (joint) or individual memory buffers for subsequent software processing on the host processor. The basic idea of a time shifting is shown in FIG. 5.

Figure 1:
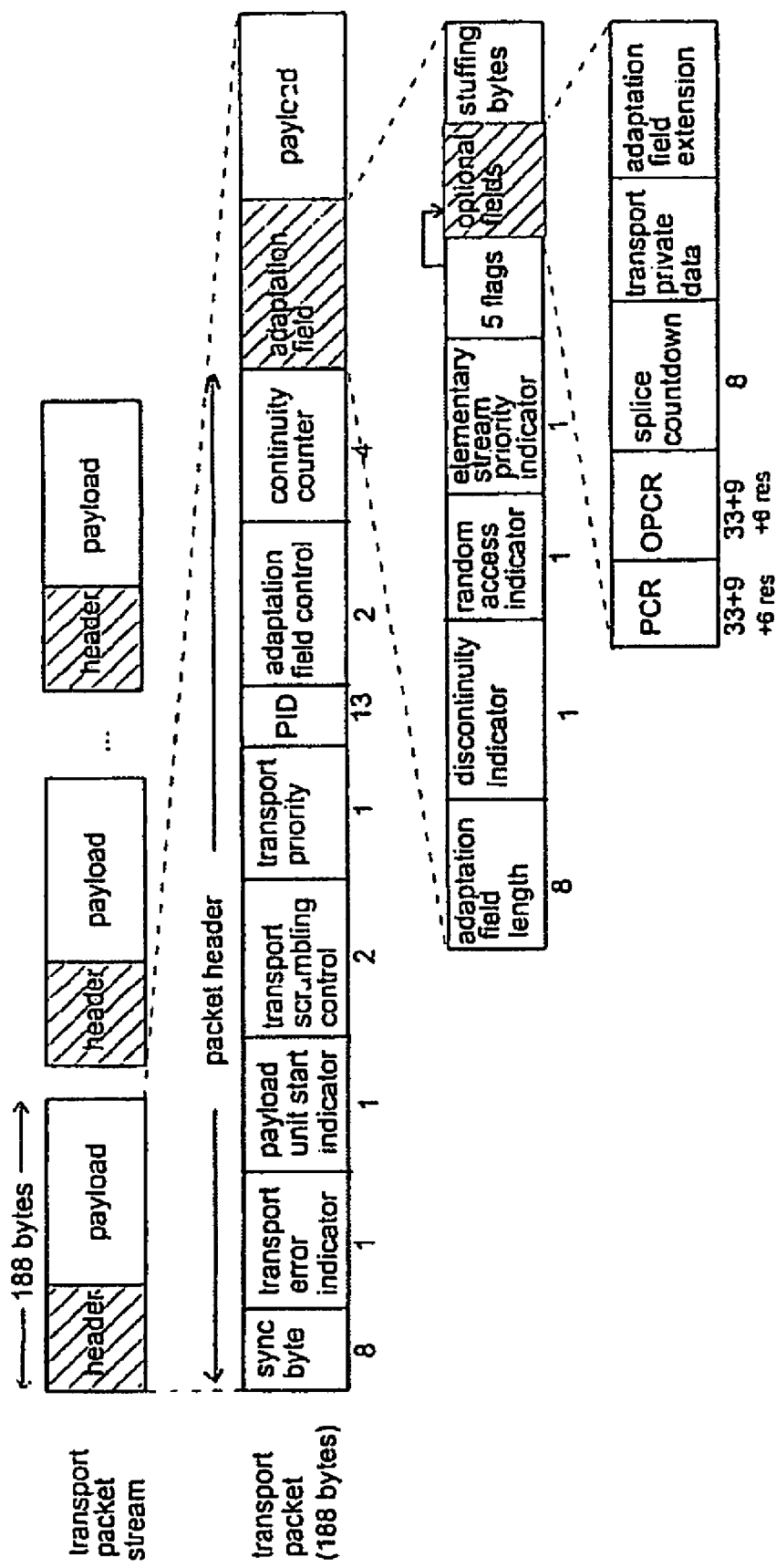
FIGS. 1-4 illustrate various information associated with an MPEG transport stream of the prior art.
Figure 2:
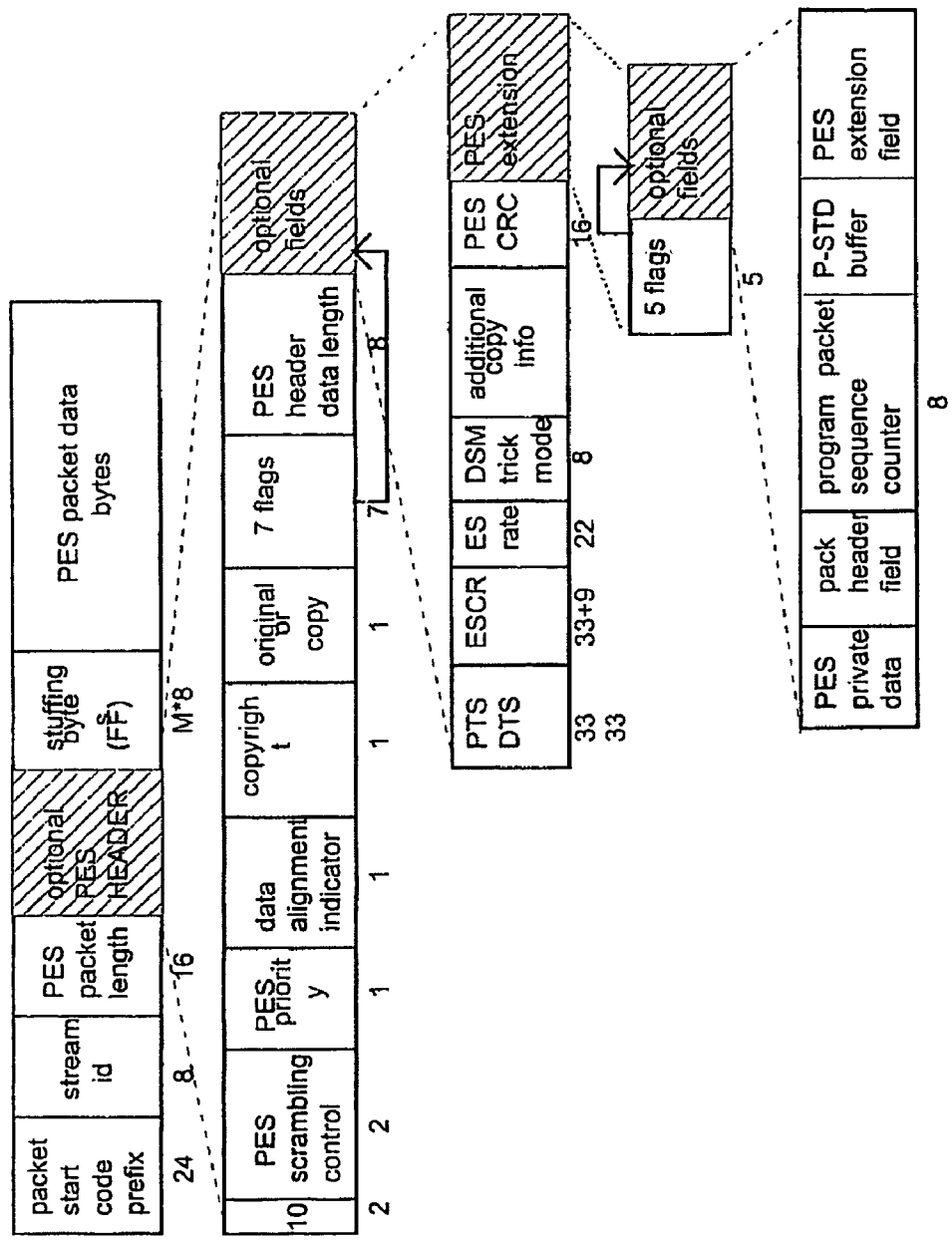
Figure 3:
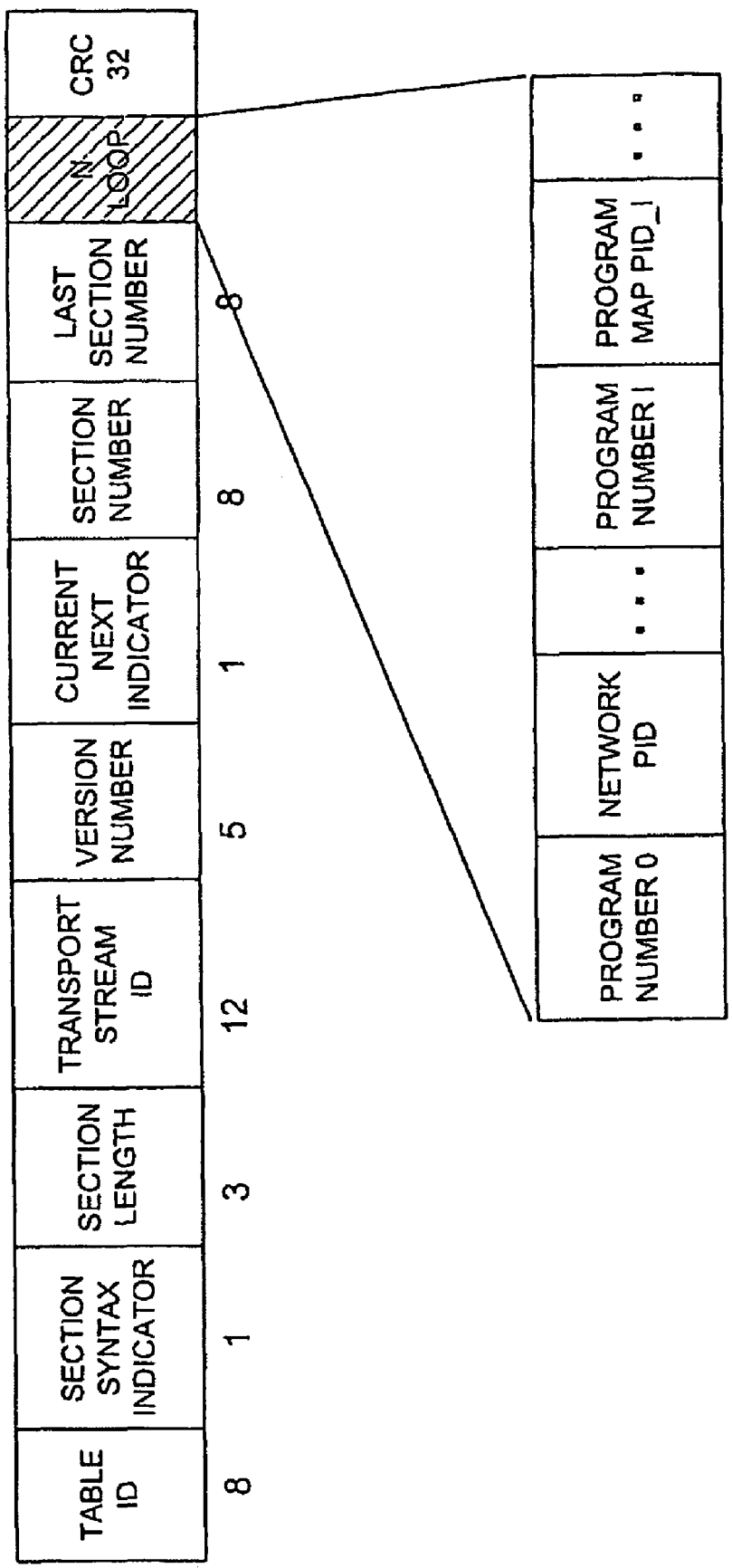
Figure 4:
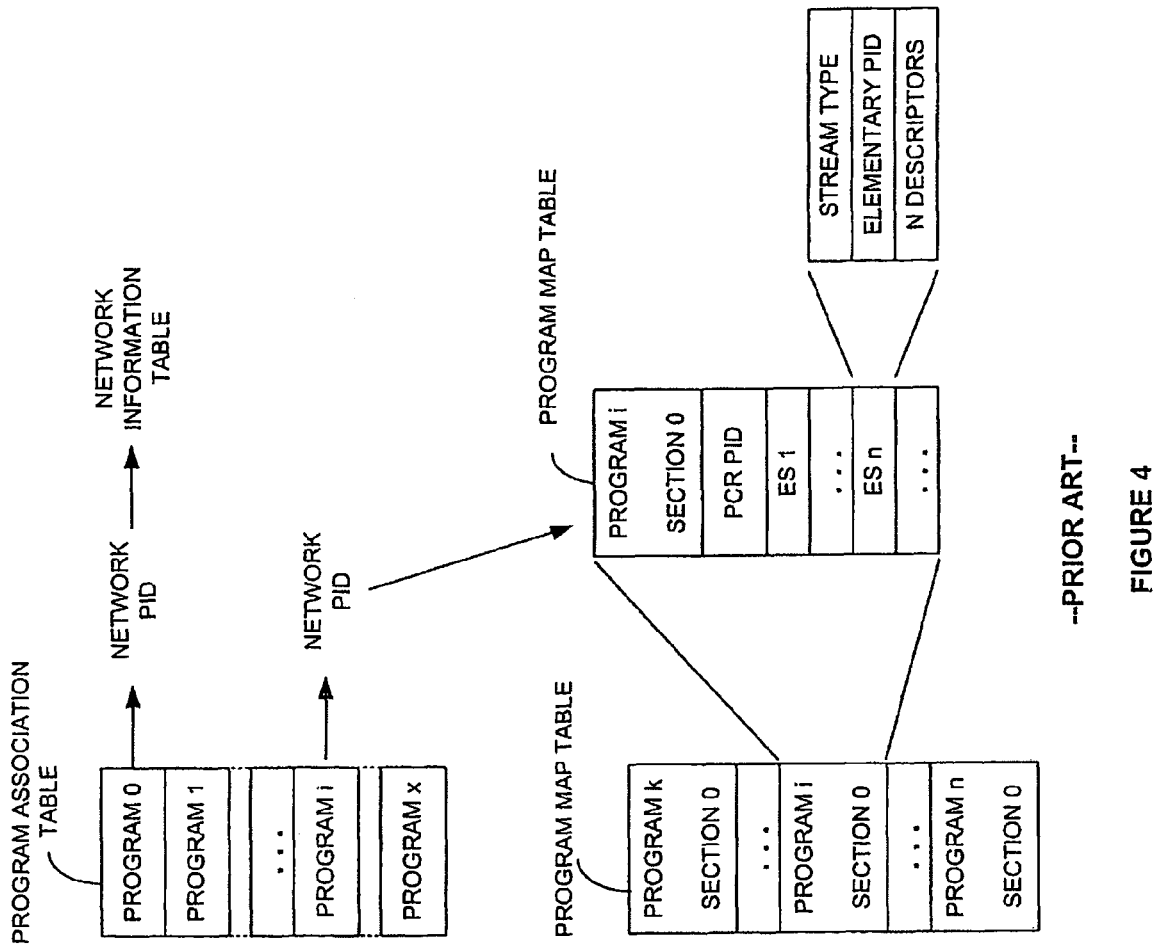
Figure 5:
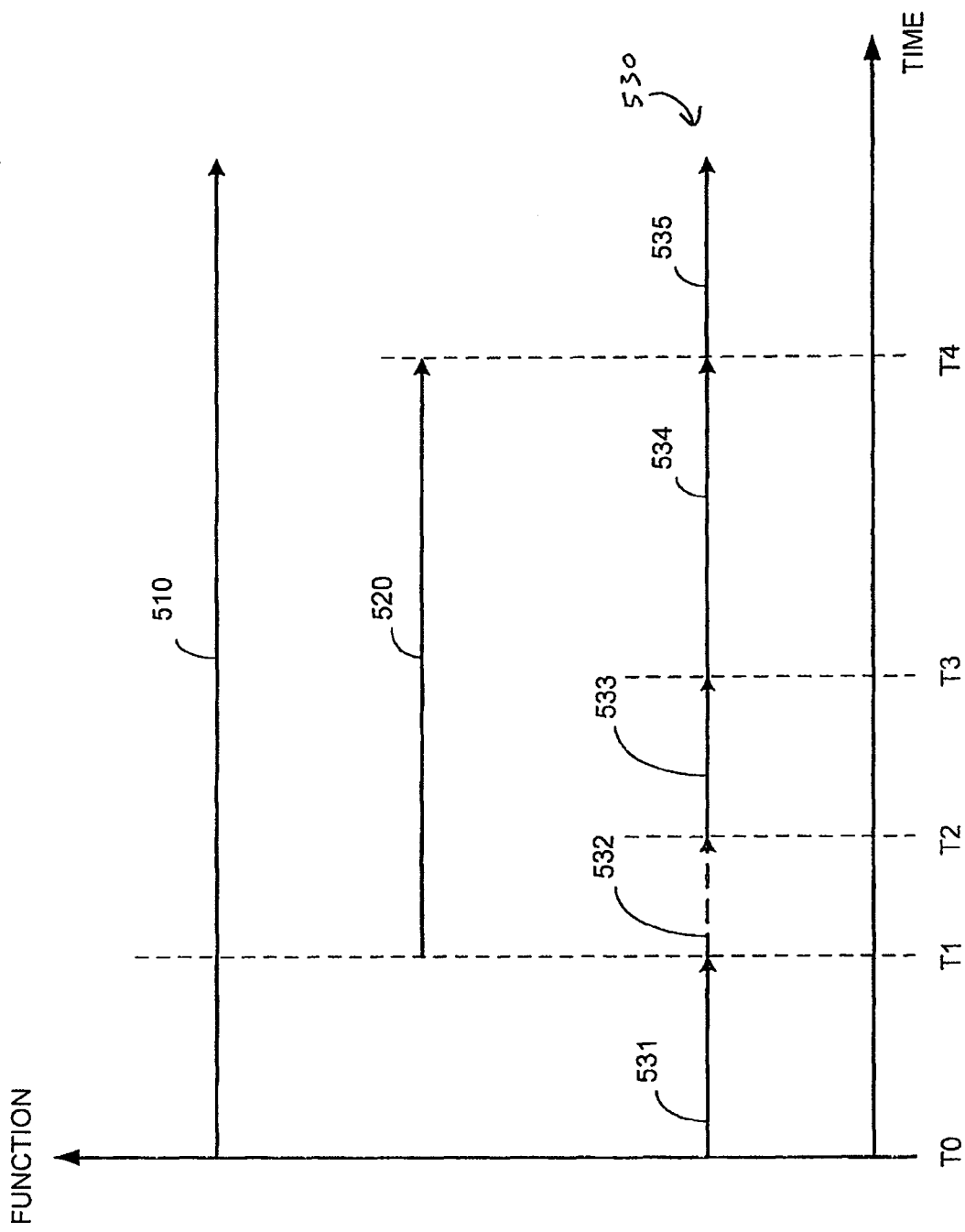
FIG. 5 illustrates in graphical form a time line indicating various modes of operation in accordance with the present invention.

FIG. 5 illustrates three functions performed by a time shifting system. A first function is to receive a live broadcast stream 510. According to the graph of FIG. 5, the live broadcast stream is continuously received during the time represented in FIG. 5.

A second function of a time shifting system is to record a specific program after a user activates the time shifting feature. Vector 520 of FIG. 5 indicates when a specific program is being recorded by the time shifting system.

A third function of the time shifting system is to display the specific program. Vector 530 of FIG. 5 indicates when a specific program is being played back. Specifically, vector portion 531 represents the time where the program is being displayed directly from the live broadcast stream. Vector portion 532 represents the time that the user is unable to view the program, i.e. the user is away from the television. Therefore, in one embodiment, during this time no program is displayed. In an alternate embodiment, the live feed can continue to be displayed, even though the program is being recorded.

Vector 533 represents the time during which the time-shifted program, which has been stored, is being replayed at a normal playback rate. Note that during this time, the live program feed continues to be recorded for future time shifted play back.

Vector 534 represents a time during which the time shifted program is being replayed at a faster than normal replay rate. By being able to playback at a faster than normal rate, it is possible to catch-up to the live broadcast stream.

The receive-only mode of vector 31 represents where the digital transport stream receiver (DTSR) is receiving a live broadcast and demultiplexing one program of a plurality of programs available in the live broadcast stream. This will be referred to as Transparent Mode indicating the transport stream is accessed immediately and not saved. Therefore, from the point of view of digital storage media (DSM), the received data is transparent.

Note that the PAT table is constantly acquired, in transparent mode, and other modes, so that version number change or PMT table PID change for a currently viewed program can be detected. If such a change occurs during the live broadcast of a program, PIDs will be reprogrammed for video and splicing with be handled.

A Continuous Time Shifting Mode occurs during vectors 532-534. Continuous time shifting mode occurs when time shifting is selected by the viewer to store part or all of a program for later viewing after a short or long intermission. During continuous time shifting mode, a selected program from a given multiplex is received and stored on a hard disk, or other storage media, in the form of full transport stream packets or PES packets.

A Part-Time Time-Shifting Mode, when selected by the viewer, allows for replay of a time shifted program or fast forward (FF) replay of a time shifted program at user defined FF speed. In FIG. 5 this is represented as vectors 533 and 534. In a specific embodiment discussed herein, this time-shifting mode is the most demanding mode of the 3 described modes because: the host CPU system is receiving and storing a real time event; at the same time, the host CPU is retrieving saved stream data from the disk; simultaneously with first two operations, the host CPU is performing transport stream de-multiplexing of video, audio, private and PSI/SI data on a host CPU; and at the same time the host CPU is restoring PCR/PTS time-base information as described later.

For some digital television applications, time-shifting may be considered a peak event that occurs sometimes or occasionally. However, some users may depend on it all the time, up to the end of the current program once it was started. For those users, typical operating state of the system is time shifting, de-coupled from the live stream. Time shifting of the digital transport stream should offer the same quality as from the live broadcast (source stream).

Systems suitable for time-shifting need to simultaneously receive and decode a transport stream and handle incoming source stream (to process all PSI and SI data) and record incoming source stream as a full entity or just its one program. Time shifting allows the viewer to step away from the TV monitor without missing any of the program parts. One embodiment of time shifting includes storing all transport packets received on the transport stream. Another embodiment of time shifting that is more efficient includes: 1) selectingjust the transport packets of interest (PSI, SI, video, audio and data packets) that constitute one program event to minimize the bit-rate of the recorded stream, to minimize the bandwidth through the host bus interface unit, and to minimize hard disk head movement (if any); 2) increasing the amount of storage and useful life of the hard disk; and 3) assuring that the amount of data that needs to be processed by the host processor is received and stored as: transport stream packets; PES packets of video, audio, data, PSI and SI content, de-multiplexed transport; or PES packets of video and audio and bus master compressed video into the video bitstream buffer of the MPEG video decoding device.

Selection of just one time shifted program reduces the potentially high bit-rate of a transport stream multiplex to a manageable size, suitable for storage on current 10 GB hard disk units (two hours of 10 Mbps stream). Obviously, a large disk drive is needed to allow any reasonable length of time shifting. In time shifting mode where time shifted material is simultaneously received and stored, the bit-rate of the host bus-interface unit (HBIU) needs to be double a system where the HBIU is only responsible for playing a single program stream. Generally the bandwidth needed is calculated to be approximately 20 Mbps instead 10 Mbps.

Because closed or proprietary systems, such as set-top boxes, usually do not share the hard disk drive with other systems, very specialized disk drives for audio-video applications with specialized interfaces can be used. Hard drive features that would be advantageous include: 1) Increasing access speeds and sustained sequence transfers in two directions; 2) Having deferred re-calibration of drive heads to prevent glitches or latencies during playback; 3) Having head offsets to prevent losing a revolution when going from side to side on a platter; 4) Supporting on the fly error correction; and 5) Having embedded multi-disk drive units that decrease access latencies.

The operating system can play a significant role in the efficient use of the drive by accessing most frequent video data in large blocks and decreasing seek time. Generally, larger read/write blocks increase efficiency of data storage and retrieval. Sometimes they can cause unwanted glitches by increasing latency during access.

Figure 6:
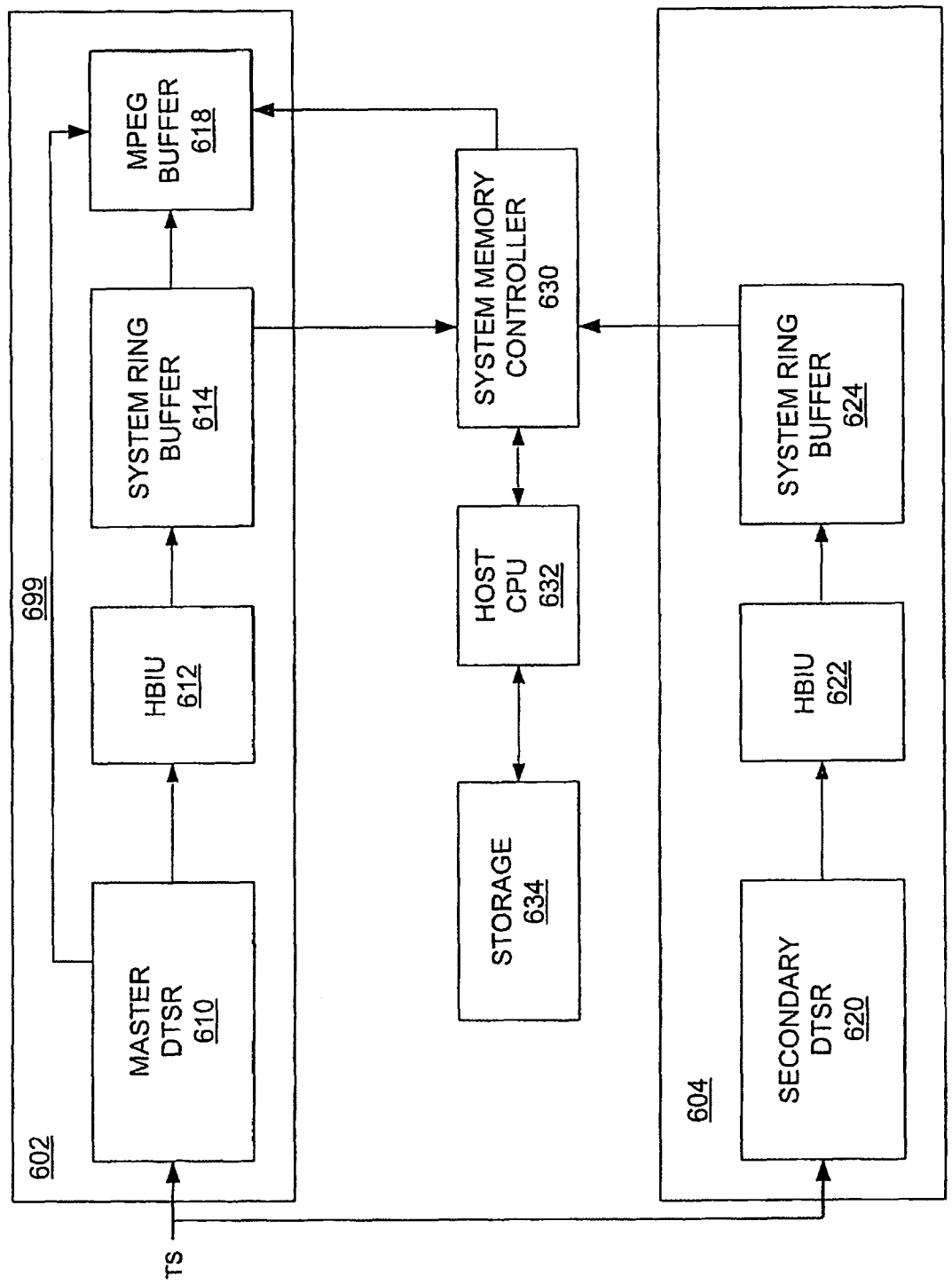
FIG. 6 illustrates in block diagram form a specific embodiment of a system having to digital transport stream receivers in accordance with the present invention.

The first time shifting mode of operation is a receive-only mode. During receive-only mode of operation a master digital time shifting receiver (DTSR) 610, of FIG. 6, is programmed to receive and parse transport stream packets matching video and PCR PIDs. A host CPU 632 is assisting MPEG-2 clock recovery, and the same recovered clock data is supplying Master DTSR 610 and the Secondary DTSR 620. In one embodiment, the recovered clock is provided to the secondary DTSR 620 registers through the use of the system memory controller 630. Also, the Master DTSR 610 is programmed to perform PID filtering of audio, private, and PSI/SI PIDs programmed in the auxiliary PID registers. Secondary DTSR 620 is programmed for PID filtering operations on Video PID programmed on a first auxiliary PID register. However, since the receiver is in receive-only mode, the video transport packets in the ring buffer 624 are disregarded. The clock recovery algorithm is suppressed on the secondary DTSR 620. Only STC of the slave DTSR is set upon the channel change. Host CPU 632 performs PES parsing of audio transport stream packets, decode and presentation of audio frames (on AC-97 codec or wave device), and continuous parsing and data processing of PSI sections monitoring real-time events like PID change, PCR discontinuity or splicing of audio stream. This activity by the host CPU 632 is part of the normal receive only mode of operation where a specified channel is being decoded and displayed. Specific systems and methods for supporting these processes are described in the patent application already incorporated by reference.

When in continuous time-shifting mode of operation, the host CPU 632 performs additional processing including: retrieval; multiplexing; time base corrections; storage of video audio, private and PSI/SI transport stream packets from multiple buffers 614 allocated in the memory space of the host CPU. In one embodiment, however, the master DTSR 620 is used to decode and display video stream as describe previously with reference to receive only mode. Transport packets from a common program are retrieved from the buffer 614 and provided to a digital storage media circular file system in a multiplexed manner. Multiplexing is performed by inserting audio, video, private, and PSI/SI transport stream packets to satisfy a group of relevant criteria.

Fundamental functions performed during continuous digital time shifting include: 1) Preserving of original ES_rate of each component stream; 2) Limiting PCR jitter of newly created single program multiplex; 3) Preserving VBV_delay value (the number of periods of a 90 KHz clock derived from the 27 MHz system clock that the VBV shall wait after receiving the final byte of the picture start code before decoding the picture) to insure non-interrupted MPEG video decode after initial VBV_delay time in constant bit-rate (CBR) stream environments; 4) Preventing underflow or overflow of elementary stream decoder buffers in accordance with the T_STD model defined in ISO/IEC 13818-1 standard; 5) providing PID values in the video or audio TS packets that were originally defined in the PMT section to be a video or audio PIDs. Alternatively, a new artificial PCR stream can be separately created and injected as TS PCR packets at the rate of at least 10 times per second to create a new time base for decimated, time-shifted stream stored on the DSM. Whereby, the original PAT transport packet is modified or a new PAT packet is inserted into the stream instead of the original PAT section to indicate a single program only whose PMT section indicates video, audio, PCR and other PID that carry subtitles, program descriptions, etc. As a stable clock source, STC of the Master DTSR is used to measure elapsed time between two PCR samples; 6) Providing PTS values in the video, audio or private data streams by using STC of the Master DTSR as elapsed time counter; and 7) Initializing STC of the playback DTSR device to a first available PCR value encoded in the stream saved on DSM media, immediately after channel change.

While in part-time digital time-shifting mode, the host CPU 632 performs some additional processing like retrieval and de-multiplexing of the single program transport stream created in continuous time digital time-shifting mode during a storage process. Generally, the playback of the stored program is combined with continued transport stream de-multiplexing and recording of the real-time transport stream. Such a mode of operation is the most intensive mode of operation because the host CPU 632 must create/store a multiplexed single program transport stream from a continued reception of a live broadcast; and retrieve and de-multiplex saved content from a digital storage media while performing transport stream de-multiplexing, audio decode, and bus mastering elementary stream video to the MPEG video decoder.

In one implementation, an MPEG decoder associated with the Master DTSR 610 is used to decode and display a video stream from a DSM media and receive private data, and PSI/SI sections from a live broadcast. In such a case, a video PID of the Master DTSR 610 is disabled, while video data with its PTS information is fed directly to the MPEG decoder using the system memory controller 630. However, PCR PID is programmed on a Master DTSR so that MPEG clock recovery continues from a live transport stream feed and is supplied to the STC counters of both the master DTSR 610 and the second DTSR 620. In one implementation, only the video PID is programmed into the Slave DTSR for retrieving live video stream and sending it to circular buffer on the host system in the form of a full MPEG-2 transport stream packets, while the Master DTSR is used to buffer the non-video components of a specific program.

In another embodiment, a different partition of the software tasks is possible on the host CPU 632 to achieve all three modes of a digital time shifting. In the second embodiment, a first DTSR is used as a combo video-PCR only device, either to receive and decode video from a live broadcast or from a DSM media. The PCR PID of the first DTSR is programmed always to match live broadcast, and full clock recovery is done by the first DTSR. A second DTSR can be used in all 3 modes to receive video, audio, private data and PSI/SI sections, all utilizing auxiliary PID filters and received as full MPEG-2 transport packets arriving in the single memory queue. This way, the temporal order of a stream and validity of the T-STD decoder model is inherently preserved. Also, the amount of the host DRAM memory required for queue allocation is less than in the first case. In both embodiments, a quality digital stream time shifting at the transport packet level is achieved.

In yet another operating mode, a different partition of the software tasks is possible on the host CPU 632 to achieve all three modes of digital time shifting by storing PES layers as a basic format of the audio/video data saved on a DSM. In PES operating mode, two hardware embodiments are possible, the same as in TP operating mode.

In a first hardware embodiment, the first DTSM is used as a combo device, to achieve playback of live or stored MPEG video and reception of audio, private & PSI/SI content. The second device is used only to receive and de-multiplex MPEG-2 video transport stream and retrieve MPEG-2 elementary stream from a live broadcast. Upon retrieval of ES video, PES packets are formed and stored on the DSM media.

In the second hardware embodiment, the first DTSM is used as a combo video-PCR only device, either to receive and decode video from a live broadcast or from a DSM media. The PCR PID is programmed always to match live broadcast, and full clock recovery is done by the first DTSR. A second DTSR is used in all 3 time-shifting modes to receive audio, private data, PSI/SI sections, by utilizing auxiliary PID filters to store the transport packets to a single memory queue. That way, a temporal order of a stream and validity of T-STD decoder model is already preserved.

In yet another time shifting embodiment, the video is de-multiplexed to the level of elementary stream and stored at the bit-stream buffer of the MPEG video decoder physically allocated in the frame memory. The MPEG video stream is then retrieved from this buffer by a software processing thread running on a host CPU. Every time a picture start code is found in the video bit-stream buffer, a full compressed MPEG picture, in the form of elementary stream, is sent to the system memory buffer by DMA. One such method is disclosed in U.S. patent application Ser. No. 09/489,682, entitled "METHOD AND SYSTEM FOR ACCESSING PACKETIZED ELEMENTARY STREAM DATA" (0100.9901350), which is hereby incorporated herein by reference.

Before storing the full compressed MPEG picture in the DSM, a PES packet header is added. The audio stream is de-multiplexed and decoded by the host CPU. In a similar fashion as the video, prior to audio decoding, the audio frames are packetized into PES packets. Essential information from the PSI/SI/private data tables is decoded and stored in a pure source form on a DSM. This way, further reduction of the host DRAM memory requirements for queue allocation and memory on the DSM media is reduced. An advantage of this mode is reduction of CPU cycles needed for A/V playback of stored data due to the PES format of audio/video data. PES de-multiplexing is done in place, passing pointers to the payload of PES packets that contain video or audio frames, other implementations required they be sent by DMA to the video decoder before they were decoded on host CPU (MPEG or AC-3 audio). As a result, the host CPU doesn't move any raw audio or video data, and host CPU utilization is reduced in order of magnitude compared to TS playback operating mode.

In the foregoing specification, the invention has been described with reference to specific embodiments. However, one of ordinary skill in the art appreciates that various modifications and changes can be made without departing from the scope of the present invention as set forth in the claims below. For example, the specific time-shifting implementation has been described as with reference to a specific transport stream demultiplexer, and described in a previous application which have been incorporated by reference. Different transport stream demultiplexers and method of implementing specific aspects of the present invention can be used as well. Likewise, specific partitions between hardware and software implementions have been described, which can vary depending upon the implemented demultiplexer. For example, the video stream parser can be designed to support routing the parsed video data to a circular buffer that is accessible by the system memory controller. Accordingly, the specification and figures are to be regarded in an illustrative rather than a restrictive sense, and all such modifications are intended to be included within the scope of present invention. In the claims, means-plus-function clause(s), if any, cover the structures described herein that perform the recited function(s). The mean-plus-function clause(s) also cover structural equivalents and equivalent structures that perform the recited function(s). Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method comprising:
    receiving a multiplexed packetized data stream that carries real-time multimedia programs;
    during a first time:
        parsing packet identifiers of the packetized data stream to identify video data and timing data associated with a first multimedia program, the timing data identified based on timing information transmitted in packets of the multiplexed packetized data stream;
        storing, in response to parsing during the first time, a first portion of the first multimedia program, the first portion comprising first video data associated with a first packet identifier and first timing data associated with a second packet identifier ; and
        setting a system time indicator to a stored system time value, wherein the stored system time value is based on a portion of the timing data of the first portion of the packetized data stream;
    during a second time:
        incrementing the system time indicator;
        retrieving the first video data of the first portion of the packetized data stream for video decoding; and
        parsing packet identifiers of the packetized data stream to identify video data and timing data associated with the first multimedia program;
        storing, in response to parsing during the second time, a second portion of the packetized data stream, the second portion comprising second video data associated with the first multimedia program and second timing data of the first multimedia program.

2. The method of claim 1, wherein storing includes providing the first video data to a first ring buffer associated with the first packet identifier.

3. The method of claim 2, wherein storing further includes providing the first video data from the first ring buffer to a hard disk.

4. The method of claim 3, wherein parsing includes parsing a transport stream header of a packet at an integrated circuit device while the packet associated with the transport stream header is being received at the integrated circuit device.

5. The method of claim 4, wherein storing further includes
    controlling access of the first ring buffer at the integrated circuit.

6. The method of claim 5, wherein storing includes providing the first timing
    data to a second ring buffer associated with the second packet identifier.

7. The method of claim 6, wherein storing further includes providing the first
    timing data from the second ring buffer to the hard disk.

8. A system comprising:

a first input to receive a multiplexed packetized data stream that carries real-time multimedia programs;

a first transport stream demultiplexer having an input coupled to the first input to select packets of data having a predefined packet identifier and an output to provide the select packets of data;

a storage device having a data port coupled to the output of the first transport stream demultiplexer to receive the select packets, wherein the storage device is to store the select packets;

a first clock recovery module having an input coupled to the first input, and an output, wherein the first clock recovery module is to generate a clock at the output based upon received timing information transmitted in packets of the multiplexed packetized data stream, the first clock recovery module to set a system time indicator based on the received timing information and to increment the system time indicator to generate the clock; and a decoder having a first input coupled to the output of the first clock recovery module to receive the clock, a second input coupled the data port of the storage device to receive the select packets, and an output to provide decoded real-time data.

9. The system of claim 8, wherein the first transport stream demultiplexer is at an integrated circuit and comprises a first parser to parse a header of transport stream while the transport packet is being received.

10. The system of claim 9, wherein the first transport stream further comprises a second parser to parse a header of packetized elementary stream (PES) stream.

11. The system of claim 10, wherein the second parser is further to parse the header of packetized elementary stream (PES) stream within a transport stream packet payload.

12. The system of claim 8 wherein the first clock recovery module is at the integrated circuit.

13. The system of claim 8 wherein the first transport stream demultiplexer is at an integrated circuit and comprises a parser to parse a header of packetized elementary stream (PES) packet within a payload of a transport stream packet being received.

* * * * *